United States Patent [19]
Kikinis

[11] Patent Number: 6,085,232
[45] Date of Patent: Jul. 4, 2000

[54] PAGER ENHANCED KEYBOARD AND SYSTEM

[75] Inventor: Dan Kikinis, Saratoga, Calif.

[73] Assignee: DataLink Systems, Corp., San Jose, Calif.

[21] Appl. No.: 09/354,700

[22] Filed: Jul. 15, 1999

Related U.S. Application Data

[62] Division of application No. 08/796,047, Feb. 7, 1997, Pat. No. 5,964,833.

[51] Int. Cl.[7] .................................................... G06F 13/00
[52] U.S. Cl. ............................................................ 709/206
[58] Field of Search ................................... 709/200, 201, 709/203, 217, 218, 219, 206

[56] References Cited

U.S. PATENT DOCUMENTS

| | | | |
|---|---|---|---|
| 5,758,088 | 5/1998 | Bezaire et al. ........................... | 709/232 |
| 5,937,161 | 8/1999 | Mulligan et al. ........................ | 709/206 |
| 5,964,833 | 10/1999 | Kikinis .................................... | 709/206 |

*Primary Examiner*—Moustafa M. Meky
*Attorney, Agent, or Firm*—Donald R. Boys; Central Coast Patent Agency

[57] ABSTRACT

A pager-enhanced keyboard connected to a subscriber's computer has a pager portion and a keyboard portion. An enhanced server connected to the Internet and adapted to collect e-mail and attachments for clients is also adapted to match incoming e-mail with a subscriber list, and to dial up a paging service and cause a page to sent to the pager portion of the keyboard at the subscriber's computer. Upon receipt of a pager message the subscriber's computer as a result of the message received initiates action ranging from lighting and blinking an LED at the keyboard to directing the computer to download and process e-mail messages and attachments, and to send downloaded information by facsimile and/or e-mail attachment to another location.

1 Claim, 4 Drawing Sheets

PAGER ENHANCED KEYBOARD AND SYSTEM

This application is a divisional of application Ser. No. 08/796,047 filed Feb. 7, 1997, now U.S. Pat. No. 5,964,833.

FIELD OF THE INVENTION

The present invention is in the area of storage and delivery of electronic documents on the Internet system, and pertains in particular to delivery of e-mail messages and attached electronic documents.

BACKGROUND OF THE INVENTION

At the time of the present invention the publicly accessible wide-area network well-known as the Internet, World Wide Web (WWW), or more simply the Web has demonstrated great success, and continues to grow at a rapid rate. Individuals, businesses, public and private agencies and the like are depending on the Web for quick access to information and for rapid transfers of large amounts of data of all sorts. According to experts and analysts phenomenal growth and development of new Web products is virtually certain to continue.

As is well-known in the art the Web operates as a world-wide network of computers (servers) connected typically over telephone systems, although various other means of connection from individual Web-capable computerized systems may be used, such as ISDN connection, TX Cable links, satellite links and the like.

Web access is provided typically by companies termed Internet Service Providers (ISPs) who take subscriptions from subscribers, which may be individuals, businesses, government agencies and the like. The ISPs provide Web servers with dial-up service to connect the subscribers to the Internet, and the subscribers pay a (usually) monthly fee for the service.

For purposes of illustration of the art and of the present invention an individual subscriber will be assumed to be connected to the Web via an individual PC and a telephone link, although, as indicated above, other connectivity is often used. The subscriber/client is provided on sign-up by an ISP with software to facilitate connection to the Web. The software is, of course, executable on the subscriber's local PC, and upon activation provides dial-up service through a modem and telephone link to the ISPs server.

Typically upon dial up the subscriber is asked to provide identity and a password, allowing the ISP to limit access through their server to those persons or organizations who are paying subscribers. Once the identification is made, connection to the Internet is provided through the ISP's server. After connection the subscriber may continue to use the ISP's systems to link to other Web sites, or may alternatively locally call up other applications to access other sites on the Internet. Other sites include servers belonging to companies who provide cross-referencing a search facilities for Internet sites, which may be individual servers or what are known as Web pages that may exist many to a single server.

A service made available by virtually all ISPs is electronic mail, known popularly as e-mail. With e-mail each subscriber has one or more e-mail addresses which identify post-office locations on a server.

E-mail was originally a means of sending usually relatively short messages to other Internet users. However, with development of ever higher-speed modems, providing faster and faster transfer or ever larger blocks of data, it has become practical to transfer electronic documents of many sorts with e-mail messages. In a typical system electronic documents, typically identified as computer files, are added as attachments to e-mail messages. Such documents may be word-processor files, high resolution images, such as replicas of color photographs, digitally represented voice files and the like. There is no limit to document size. This sort of communication is arguably now the greatest mover of information in existence, and growing rapidly.

Because of the nature of Internet connection, such as through phone links, which are times charged to users, and also because connect time is charged to subscribers by ISPs, full time or even long term connection to the Internet is most often not an option. Such connection would just be prohibitively expensive for most organizations and individuals. Accordingly, e-mail messages and attachments are stored on the ISPs server, and a subscriber accesses the server periodically by dial up to check his/her mailbox for new mail. Typically the ISP software or a locally-based application, such as Microsoft Exchange™, handles communication with the ISP server, and facilitates listing of new mail, composing and sending of messages, addition of attachments, and the like.

Provision is always made for a subscriber to manually request access to his/her ISP and to mail service, and many computer applications that make use of the Internet may now be configured to trigger dial up as needed when the application is running. Such application-triggered dial-up typically provides for approval by the subscriber, but may in some cases remember the user ID and password, and provide the connection seamlessly and transparently.

The large amounts of information now being handled over the Internet together with intermittent access as described herein leads to difficulties. One difficulty is that some information is time sensitive, losing value rapidly if not updated and acted upon. An example of such information is changes in stock and commodity prices. Another difficulty is that server capacity, while enormous, is not unlimited, and storage capacity is costly. Because information directed to subscribers is not quickly downloaded, storage capacity has to be commensurately large.

One possible solution to the problem known to the inventor is a system that pages a subscriber when new mail is logged into the subscriber's ISP mailbox. If the subscriber is near his/her computer or computerized equipment, this is an advantage. If not, the service is of little use.

What the present inventor sees as a clear and present need is a system and method that uses paging technology to notify a subscriber's computer, and optionally the subscriber as well, of new mail to be accessed and processed, and further capability for the subscriber's computer to dial up the ISP server upon notification and download the new mail and any attachments. Such a system could optionally be programmed to further process such newly-arrived mail. It is to these and other related objects that embodiments of the present invention are directed.

SUMMARY OF THE INVENTION

In a preferred embodiment a client/server e-mail system is provided comprising a server coupled to the Internet and adapted to receive e-mail messages including attachments for an individual subscriber; and a subscriber's computer having an on-demand dial up connection to the server and also connected to a keyboard, the keyboard equipped with a microprocessor and page-receiving circuitry. Upon receipt of e-mail addressed to the subscriber, the server dials up a pager service and causes a pager message to be sent to the page-receiving circuitry at the keyboard, and wherein the circuitry at the keyboard, on receiving the pager message, communicates the pager message to the microprocessor.

In various embodiments the pager-receiving circuitry at the keyboard further comprises an LED, and the action activated at the keyboard includes illumination of the LED as an attention device to the subscriber. There may also, as an option, be a display, and the action activated at the keyboard includes display of a portion of the received pager message on the display.

In one alternative the pager message received is adapted to simulate keystroke codes and to transmit the keystroke codes to the subscriber's computer connected to the keyboard. In another the microprocessor in the keyboard is adapted with drivers to be called and executed in response to specific pager messages received. The drivers generate keystroke codes adapted to cause the subscriber's computer to achieve certain functions, such as initiating a dial-up connection to the server to download e-mail and attachments for the subscriber, and sending downloaded information by facsimile and new e-mail messages to other locations.

In some instances pager messages received are keystroke codes adapted to initiate the desired actions at the subscriber's computer. In other instances the pager messages are special scan codes adapted to activate special drivers at the keyboard, which in turn generate keystroke codes to initiate the actions.

In one aspect of the invention a pager-enhanced keyboard is provided and methods for practicing the invention are taught as well.

BRIEF DESCRIPTION OF THE DRAWING FIGURES

DESCRIPTION OF THE PREFERRED EMBODIMENTS

Figure 1:
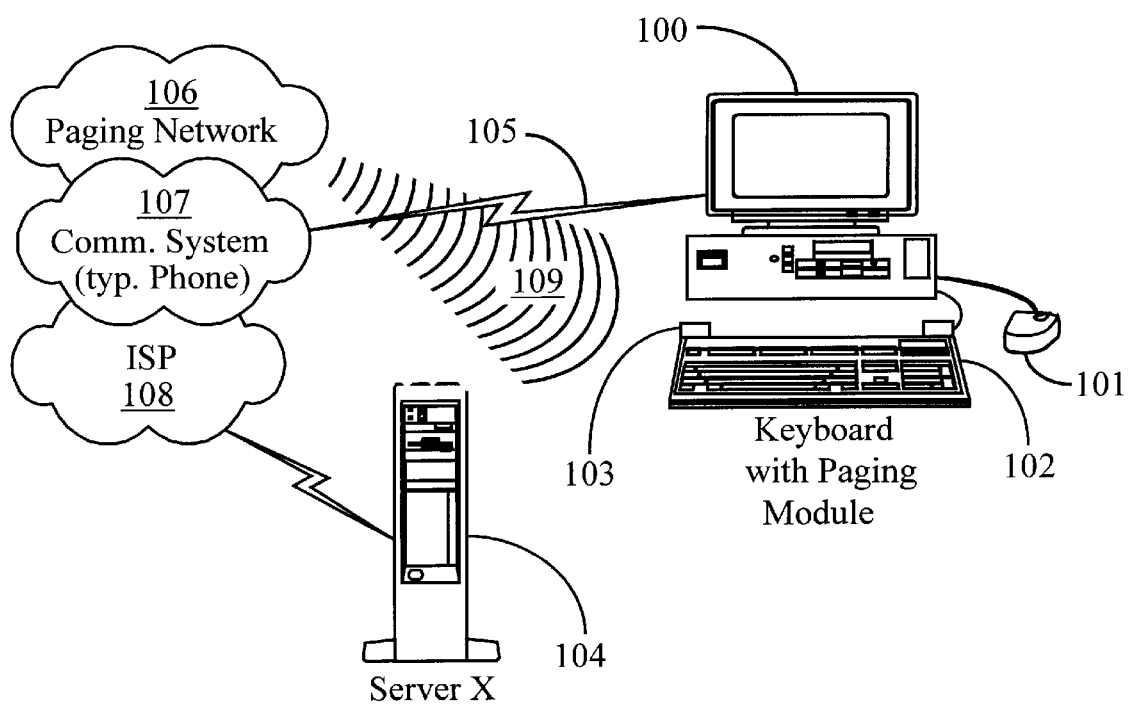
FIG. 1 is a mostly schematic representation of a system according to an embodiment of the present invention.

In various embodiments of the present invention a subscriber's computer is enabled to respond to paging signals sent by an ISP related to new mail arrived for the subscriber. FIG. 1 is a mostly schematic representation of such a system according to a particular preferred embodiment of the present invention.

In the embodiment of the invention illustrated by FIG. 1 a subscriber's computer 100 is connectable to an ISP's (represented by 108) server 104 on the Internet via telephone system 107 through a modem connection 105. The subscriber's computer is serviced by a pointer device, in this case mouse 101 and keyboard 102. In this embodiment keyboard 102 is associated with a unique pager-responsive module 103 which is described in further detail, including examples of operation, below.

Figure 2:
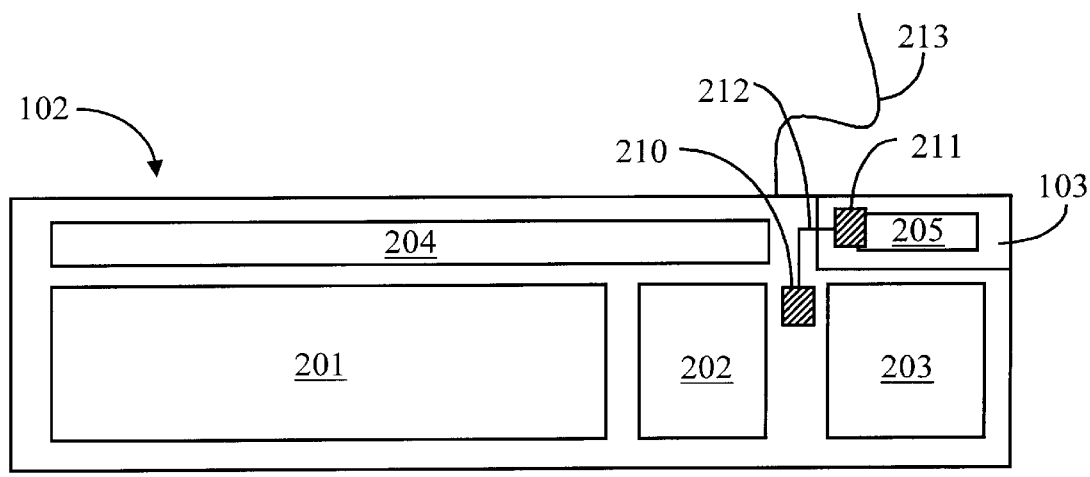
FIG. 2 is a schematic plan view of a keyboard for a computer according to the embodiment of the invention illustrated by FIG. 1.

FIG. 2 is a plan view of keyboard 102 of FIG. 1, illustrating a conventional key arrangement 201, a function key row 204, cursor key cluster 202, and alpha-numeric key cluster 203, all conventional. Keyboard is connected to computer 101 of FIG. 1 by a communication link 213, which may be a well-known keyboard PS-AT™ connector cable, a Universal Serial Bus (USB), a standard or enhanced serial port and the like. Keyboard 102 is also connected to a pager-responsive module 103, which may be built in to the keyboard or be alternatively a connectable module. Module 103 for example could be a module conforming to PCMCIA standards for communication and form (often termed a PC card in the art), and keyboard 102 may have a PC card slot for engaging module 103 or optionally other PC cards.

Pager module 103 in the embodiment, wherein pager module 103 is a removable and connectable module, has a microprocessor 211, and when connected to keyboard 102 microprocessor 211 connects to another microprocessor 210 in the keyboard module. Communication between the two microprocessors is over bus 212. In alternative embodiments, wherein the pager circuitry is a part of the keyboard rather than a removable and connectable module, there need be only a single microprocessor.

Module 103 in this embodiment also has an associated LED for indicating activity, and the module is adapted to activate (illuminate) LED 103 and optionally to cause the LED to blink at some rate to call attention to the fact that it has been activated. Optionally there may be an LCD display 205 for displaying a pager message.

In operation, when server 104 receives new e-mail for a subscriber, the server, through executable control routines at the server, dials up a paging service 106, and a prestored pager message is sent to the subscriber's unit 103. Upon receipt of the page the receiving system integrated with module 103 at a minimum activates LED 213 to inform the subscriber (when the subscriber comes near the keyboard, that new mail is waiting at the server to be downloaded.

In preferred embodiments, rather than simply lighting the LED, the system of the invention does considerably more. In those computers having a sleep mode, adaptation may be made to wake up the computer and to initiate further processing. Further processing may also be a feature in embodiments associated with computers that are left on.

In these cases the pager message is adapted to trigger, for example, dial up to server 104 through modem connection 105, and downloading of all available new mail and attachments. Such processing, through programming at the receiving computer may include temporary storage in a preprogrammed location allowing the subscriber, on his/her return to the computer, to review the new mail and to make appropriate disposition before further processing.

For example, the subscriber may wish to delete some of the arrived mail, print other portions, and to store other items for later use.

Such further processing as described immediately above may be relatively sophisticated. For example, in one preferred embodiment provision is made through unique control routines for a user to instruct his/her computer to download mail, check the ID of the sender, and to then forward attachments only found in e-mail from a particular correspondent by fax, over modem 105, to a preprogrammed destination.

As a further example of post processing, a user may also program at the receiving end to process mail at specified times-of-day and/or at certain time intervals. This feature avoids the prospect of triggering a dial-up to the ISP upon receipt of every single piece of mail. When mail is received at the server in this instance, a page is generated, but the subscriber's system delays dial-up until a certain time. For example, all messages received after 8:00 PM may be delayed for pick up until 8:00 AM, while pickups may be triggered every hour on the hour between 8:00 AM and 8:00 PM.

There are optional arrangements that may be made for paging devices in various embodiments of the invention. What is important, as will be apparent to those with skill in the art, is that discrimination be made among subscribers so only the correct subscriber gets his own e-mail. One way this can be accomplished is that each subscriber have his/her own paging account. Then only the correct subscriber will paged in any case. Another option is to have one paging account, and to page by subscriber's phone number or other identifying data.

In the instance of multiple subscribers sharing a single paging account, the subscriber may, when his own number is displayed, dial up and download his waiting e-mail. Discrimination is achieved by the fact that only the correct subscriber, through member ID and password at the ISP server, may access his mailbox and download stored messages and attachments.

The pager unit may operate in either of at least two ways. In one embodiment the ISP, upon receiving new mail for a subscriber, sends a page that is a normal keyscan code sequence, which activates control routines on the subscriber's computer by mimicking user input; or, in another embodiment a special key scan may be generated (not in the keyboard's usual repertoire), and this scan code is intercepted by a special driver in the keyboard and acted upon accordingly.

Figure 3A:
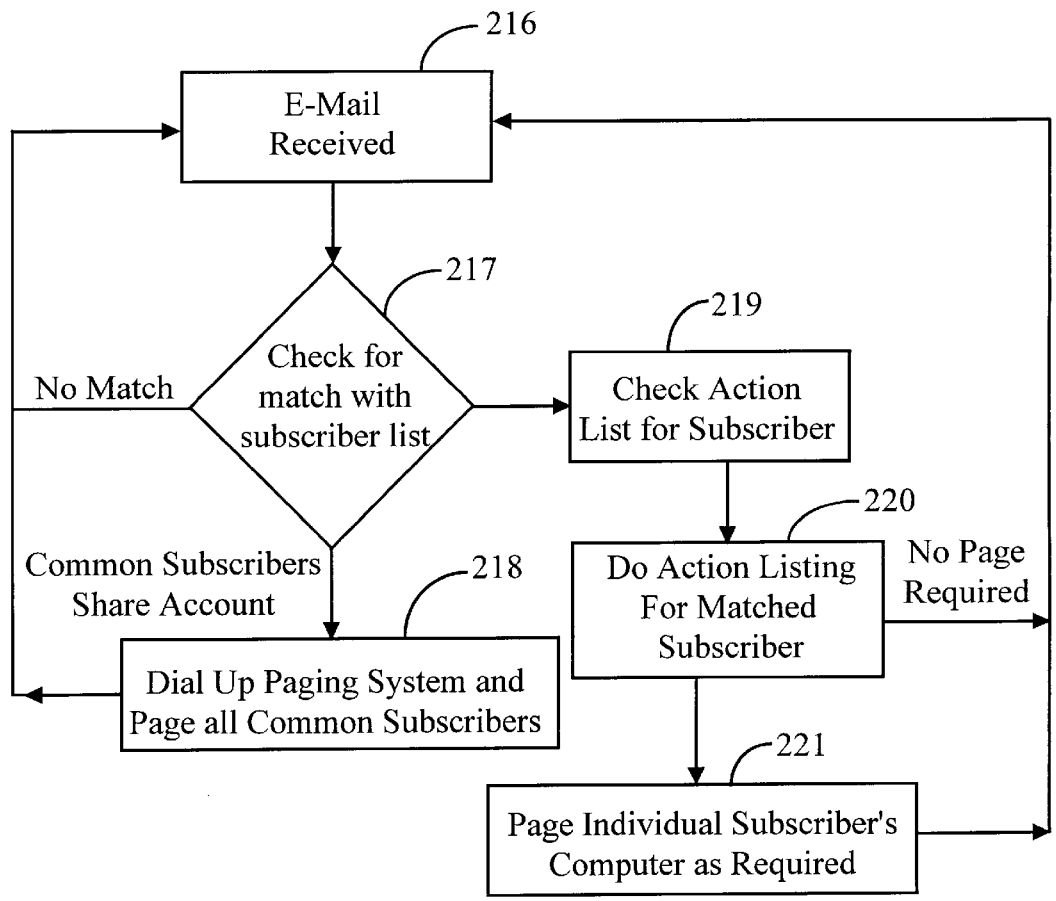
FIG. 3A is a flow diagram illustrating steps in practicing the embodiment of the invention illustrated in FIG. 1 and FIG. 2, at a server.

FIG. 3A is a flow chart depicting step-by-step operations in practicing the present invention at an ISP server such as server 104 in FIG. 1, including several alternatives, but not all possible alternatives within the scope of the invention. As in most such charts entry into the step-by-step flow may be any arbitrary point for purposes of description. In this instance illustration begins at step 216, which is the event of receipt at server 104 (FIG. 1) of an e-mail message.

Receipt of an e-mail at step 216 triggers control routines at the server at step 217 to check for match with a subscriber list. If the addressee for the e-mail is on a stored subscriber list at the server, the server then processes the e-mail according to control routines associated with embodiments of the present invention. If the e-mail addressee is not in the list (no match), control returns to step 216 to check for further e-mail received.

One option in the invention at this point is the option previously described, wherein a group of subscribers may share a single paging account. In this instance control goes to step 218 where the paging system is dialed up, and a page is sent to all of the subscribers sharing the single account. The page sent however, identifies the correct subscriber by an ID such as the subscriber's phone number (or a portion of the phone number may be sufficient). In this embodiment the server makes no further discrimination, and all options are up to the subscriber or control at the subscriber's end. Following the paging message sent control returns to step 216 to monitor for receipt of new messages.

It will be apparent to those with skill in the art that actual operation in the server is somewhat different than that indicated in the flow chart. The server, of course, does not have to wait until a page is sent for each message received before going back to monitor for new messages, but may perform many operations in parallel with others.

In another aspect of the invention wherein different subscribers desire different actions at the server, flow goes to step 219, and the server checks a stored action list, provided by the subscribers at sign up and perhaps updated periodically. One subscriber may want to be paged on receipt of each message. Another may want the system to page his computer when a batch of six messages is received. Another may have a schedule for downloading according to various times of day. and so forth. Even the subscriber that wants every message paged may have local control routines for scheduled downloading and special processing, so there are levels of discrimination that may be made, both at the server according to prestored instructions from subscribers, and at the subscriber's computer, where the subscriber may amend instructions as desired from time to time.

At step 220 the server executes the action sequence prestored for the particular subscriber. If no page is yet required according to the action list, control goes back to step 216 to check for further e-mail receipt. At some point in each subscriber's action list a page to the subscriber's computer is required, and this is shown as step 221. After execution of the page control loops back again for further processing of incoming messages and attachments.

Figure 3B:
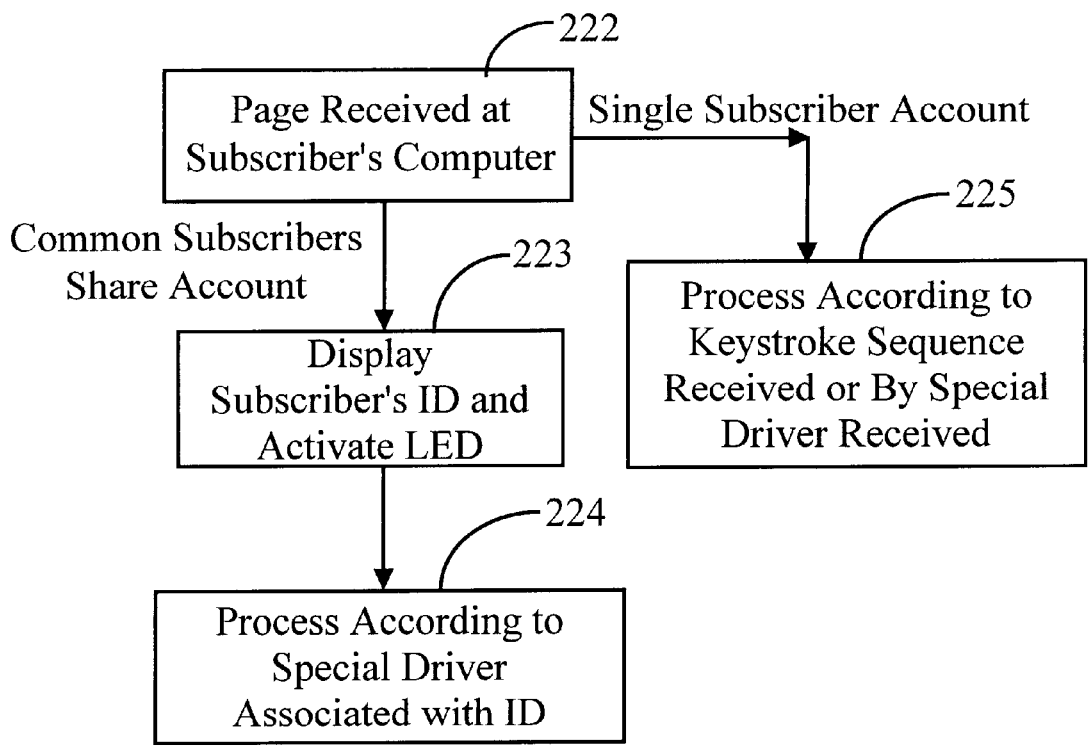
FIG. 3B is a flow diagram depicting steps of practicing the present invention at a subscriber's computer.

FIG. 3B illustrates steps in practicing the invention upon receipt of a page at a subscriber's computer, including several options, but not all option within the scope of the present invention.

At step 222 a page is received at the subscriber's computer. In the instance that this subscriber shares a paging account with other subscribers to the service, control goes to step 223 where the subscriber's ID, such as a portion of the subscriber's phone number, is displayed on LCD display 205 (FIG. 2). At the same time LED 213 is activated, and may be set to blinking as an attention device. This ID may be also be associated with a special driver, as described above, to instigate action further processing, such as dial up to the server, downloading messages and attachments, and the like, all represented by step 224.

In the instance wherein the subscriber has an individual account, the page code can also activate, in either of at least two ways as described above, further processing at step 225. As also described above, this further processing may be relatively simple downloading and storage, or relatively sophisticated, such as both local storage and sending a fax to a prestored destination.

It will be apparent to those with skill in the art that there are many alternatives to the embodiments described which fall within the spirit and scope of the present invention. For example, alternative action may be triggered at either the server or at the subscriber's computer. Also, there are alternative ways that circuitry can be implemented at either the server or the subscriber's computer. In addition, it is well-known in the art that individual programmers have strong preferences in the way that computer functions may be programmed. Still, it is within the ability of skilled programmers to provide code sequences that a quite different but accomplish essentially the same purposes.

What is claimed is:

1. A method for delivering e-mail and attachments to a subscriber's computer comprising steps of:

a) storing a subscriber list on a server adapted to receive and store e-mail for subscribers;

b) matching addressees on incoming e-mail with the subscriber list;

c) dialing up a pager service in the event a match is found between a received e-mail and the subscriber list;

d) causing a prestored page to be sent to a prestored destination associated with the subscriber's list;

e) receiving the page at paging circuitry coupled to a keyboard at the subscriber's computer; and f) initiating an action at the keyboard, the action associated with the prestored page.

* * * * *